W. E. LINCOLN.
APPARATUS FOR OBTAINING CREAM FROM MILK.
No. 262,065. Patented Aug. 1, 1882.
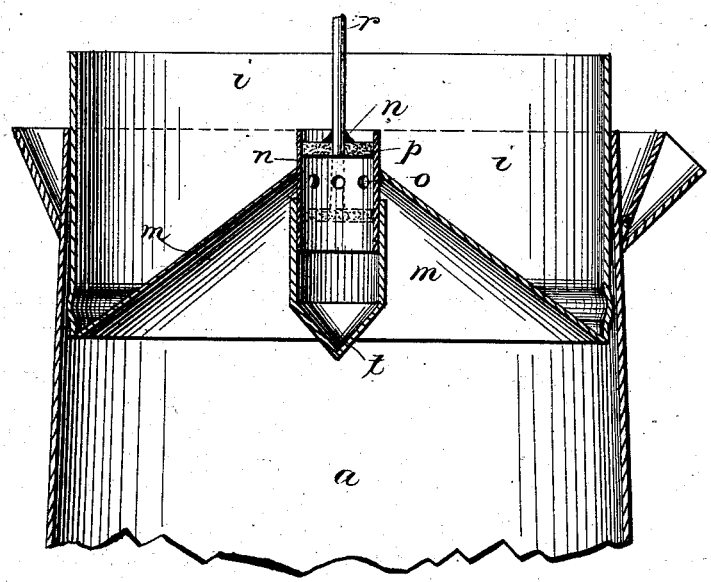
WITNESSES
F. L. Ourand
Wm. H. Finckel
INVENTOR.
William E. Lincoln
by Crosby & Gregory
Attorneys

UNITED STATES PATENT OFFICE.

WILLIAM E. LINCOLN, OF WARREN, MASSACHUSETTS.

APPARATUS FOR OBTAINING CREAM FROM MILK.

SPECIFICATION forming part of Letters Patent No. 262,065, dated August 1, 1882.

Application filed January 2, 1880.

*To all whom it may concern:*

Be it known that I, WILLIAM E. LINCOLN, of Warren, county of Worcester, State of Massachusetts, have invented an Improvement in Apparatus for Obtaining Cream from Milk, of which the following description, in connection with the accompanying drawing, is a specification.

This invention relates to apparatus for creaming milk; and the invention consists in a device for removing the cream from the top of the milk while in its cooling-vessel.

The invention is shown in central vertical section in the drawing.

The vessel $a$, the top only of which is shown, may be of any approved pattern for cooling the milk, and thus separating or causing the rising of the cream.

The apparatus for removing the separated cream from the top of the milk is shown as a cream-receptacle, $i$, of proper shape to just fit within the milk-vessel, a suitable packing being used, if necessary, to insure a close fit therein. The bottom $m$ of the cream-receptacle, preferably inclined upward from the edges, as shown, is provided with an opening for the passage of the liquid from the space below into the cream-receptacle, shown as a short tube, $n$, open at its upper end and extended into the cream-receptacle, and provided with small holes $o$ below the bottom of said receptacle. This passage may be opened to allow the cream to flow through or closed to separate the said cream, when in the cream-receptacle, from the milk below, and enable the cream to be removed and emptied out as desired.

Any suitable valve may be used to control the passage of the fluid—as herein shown, a piston, $p$, provided with a handle, $r$. When said piston is above the holes $o$, as shown in full lines, the passage-tube $n$ is closed against the passage of the cream; but when the piston occupies the position indicated by dotted lines the tube is open to the passage of the cream, and the cream-receptacle $i$ being pressed down upon the separated cream and milk in the can, the cream or upper portion of the liquid is thereby pressed up and caused to overflow from the tube $n$ into the cream-receptacle $i$, and when all the cream has passed through the piston is raised, closing the bottom of the cream-receptacle, which may be removed with the cream contained therein. Inclining the bottom of the cream-receptacle upward, as shown, concentrates the cream and renders it easy to obtain the whole of it, without any admixture of skim-milk, and it is obvious that by extending the tube $n$ a sufficient distance up into the receptacle $i$, when used either with inclined or plane bottom, the valve $p$ might be dispensed with, the cream being allowed to overflow into the annular space around the said tube.

When desired, the bottom of the tube $n$ may be made conical or covered with a conical cap, $t$, to enable it to pass into the cream without disturbing it.

I claim—

1. In an apparatus for obtaining cream from milk, the herein-described device for removing the separated cream from the top of the milk, consisting of a cream-receptacle made to fit closely into the top of the milk-vessel, the said receptacle being provided with an opening in its bottom to allow the cream to pass up from the milk-vessel into the cream-receptacle, substantially as described.

2. In an apparatus for creaming milk, the combination, with the milk-vessel, of a cream-receptacle shaped to fit closely in the top of said vessel, and provided with an opening in its bottom and a valve to control the passage of the liquid through the said opening, substantially as and for the purpose described.

In testimony whereof I have signed my name to this specification in the presence of two subscribing witnesses.

WILLIAM E. LINCOLN.

Witnesses:
G. W. GREGORY,
N. E. C. WHITNEY.